Patented Apr. 19, 1927.

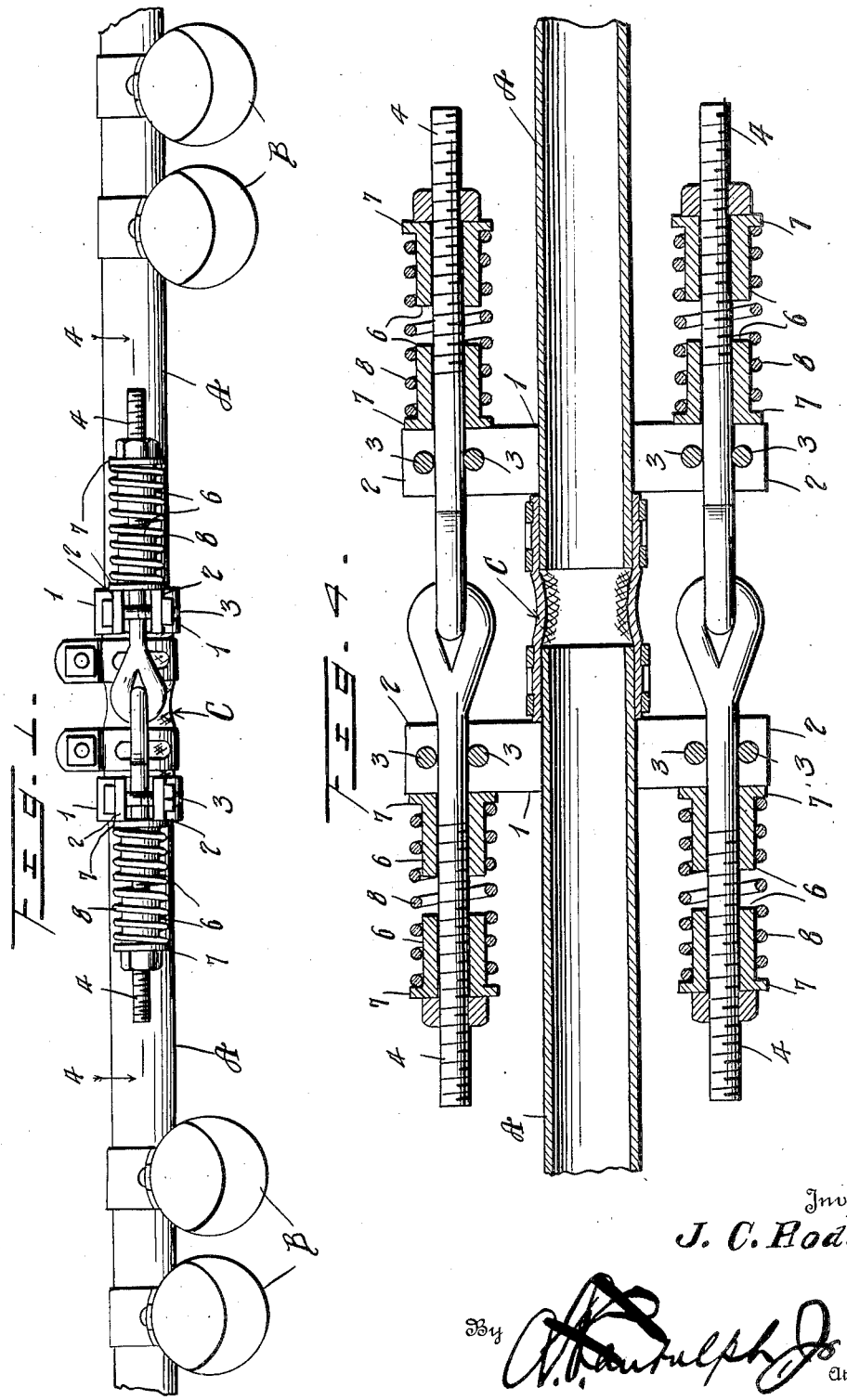

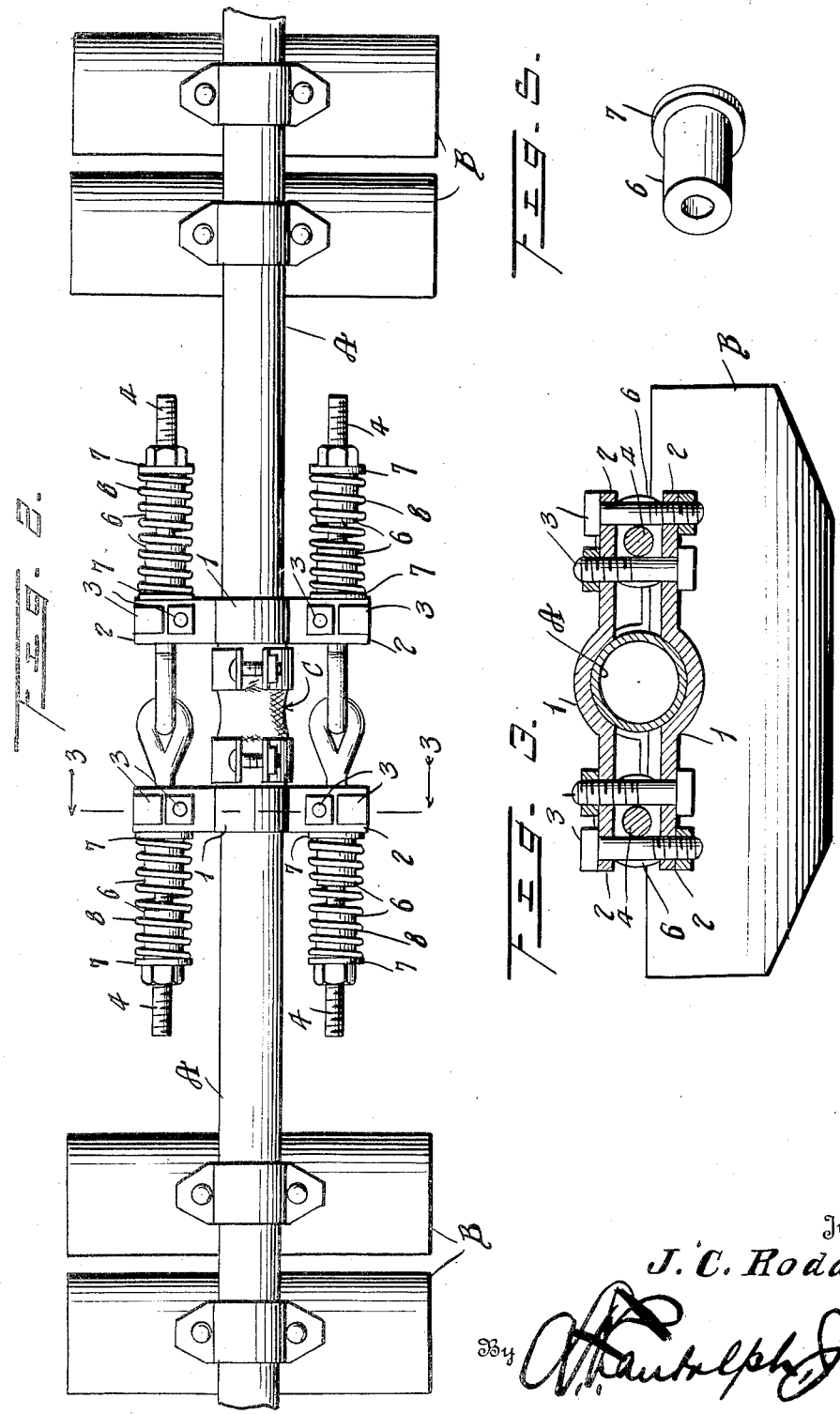

1,625,684

UNITED STATES PATENT OFFICE.

JOHN C. RODDY, OF PALATKA, FLORIDA.

REENFORCING MEANS FOR FLEXIBLE COUPLINGS OF PIPE LINES.

Application filed April 22, 1926. Serial No. 103,857.

The invention relates to means for reenforcing the flexible couplings of pipe lines to prevent drawing off of the flexible coupling by excess of pressure in the pipe lines.

The invention is directed to pipe lines used for conveying silt and débris from dredgers to the point of deposit, the method usually employed consisting of having a plurality of pipe sections mounted on pontoons to float the pipe sections, the pipe sections being connected end to end by flexible tubing such for instance as short lengths of hose. By this construction the pipe line is flexible to permit relative movement of the adjacent sections, and the flexible couplings are liable to be disconnected from the pipe sections by the relative movements of adjacent pipe sections and excess of pressure in the pipe line.

The invention has for its object the provision of a reenforcing means for the flexible coupling comprising clamp members secured to the pipe sections of each joint and carrying jointed rods forming hinge members that are slidably mounted on the clamps, and providing springs on the ends of the rods to normally hold the reenforcing means and the flexible coupling contracted, said springs permitting a limited movement of the clamp members in expanding the reenforcing means and the flexible coupling.

A further object of the invention is the provision of flanged bushings on which the spring means are mounted, said bushings being normally spaced from one another and functioning to permit the expansion of the reenforcing means and the flexible coupling to prevent the flexible coupling from being subjected to an excess strain.

The invention will be described in detail hereinafter and will be found illustrated in the accompanying drawings in which Figure 1 is a side view of a fragment of a pipe line showing the reenforcing means in position, Figure 2 is a plan view, Figure 3 is a transverse sectional view on a plane indicated by the line 3—3 of Figure 2, Figure 4 is a sectional detail on a plane indicated by the line 4—4 of Figure 1, and Figure 5 is a perspective view of one of the bushings.

In the drawings similar reference characters will be used to designate corresponding parts throughout the several views.

A fragment of a pipe line used for conveying silt and other débris from a dredge is shown in Figures 1 and 2 and comprises sections of pipe designated A, each section of pipe being supported by one or more pontoons B, and C a flexible coupling connecting adjacent ends of pipe sections A.

As heretofore stated the purpose of this invention is to reenforce the flexible coupling C and said reenforcing means comprises clamp members 1 having arms 2 extending laterally from the pipe A, and held clamped on the pipe A by means of bolts or other fastenings 3 secured to said arms 2, said fastening means comprising two bolts secured through each pair of arms, and spaced apart to receive rods 4 and permit slidable movement of said rods relatively to said clamp, said rods being hinged together by interengaging eyes. Slidably mounted on each of the rods 4 are bushings 6 having flanges 7, and 8 indicates expansible coil springs mounted on each pair of bushings and having the respective ends thereof engaging the flanges 7. It will be apparent that springs 8 normally hold the adjacent pipe sections A in alinement and the reenforcing member and the flexible coupling contracted but that the movement of the pipe sections relatively to one another is permitted and cushioned by the springs, the bushings 6 serving to limit the expansion of the joint and the relative movement of the pipe sections into angular position.

In the drawings, the reenforcing means are shown to comprise two hinged rods at each joint. I do not, however, limit the invention to the employment of two rods as it may be found desirable to increase the number of the hinged rods to 4 or more, the drawings being illustrative of one adaptation of the invention only

What is claimed is:—

1. Reenforcing means for flexible couplings of pipe lines, including pipe sections, and a flexible coupling connecting said pipe sections, comprising clamp members secured to the pipe sections adjacent to the flexible coupling, said clamp members having spaced arms, rods slidably mounted between said arms and hingedly secured together between the clamp members, and springs mounted on said rods and operatively connected to said arms to normally hold the pipes in alinement.

2. Reenforcing means for flexible couplings of pipe lines including pipe sections, and a flexible coupling connecting said pipe sections, comprising clamp members secured to the pipe sections adjacent to the flexible coupling, hinge members comprising jointed rods connecting said clamp members, said rods being slidable in the clamp members, bushings slidably mounted on said rods, and springs engaging said bushings and holding them separated normally, said bushings forming stops to limit the movement of the pipe sections away from one another.

In testimony whereof I affix my signature.

JOHN C. RODDY.